US006814777B2

(12) United States Patent
Biberbach

(10) Patent No.: US 6,814,777 B2
(45) Date of Patent: Nov. 9, 2004

(54) PLATINUM AND PLATINUM ALLOY POWDERS WITH HIGH SURFACE AREAS AND LOW CHLORINE CONTENT AND PROCESSES FOR PREPARING THESE POWDERS

(75) Inventor: Peter Biberbach, Rodenbacher (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 10/209,084

(22) Filed: Jul. 31, 2002

(65) Prior Publication Data

US 2003/0079566 A1 May 1, 2003

(30) Foreign Application Priority Data

Aug. 4, 2001 (EP) .............................................. 01118930
Aug. 30, 2001 (EP) .............................................. 01120859

(51) Int. Cl.$^7$ ................................................. B22F 1/00
(52) U.S. Cl. .............................. 75/255; 75/343; 75/351; 75/368; 75/370; 75/371; 429/40; 502/326
(58) Field of Search .......................... 75/255, 343, 351, 75/368, 370, 371; 429/40; 502/326

(56) References Cited

U.S. PATENT DOCUMENTS

| 3,620,713 | A | * | 11/1971 | Short ........................... 75/370 |
| 3,962,139 | A | * | 6/1976 | van de Moesdijk et al. 502/215 |
| 3,992,192 | A | * | 11/1976 | Vartanian |
| 6,551,960 | B1 | * | 4/2003 | Laine et al. ................. 502/327 |
| 6,572,673 | B2 | * | 6/2003 | Lee et al. ...................... 75/362 |

FOREIGN PATENT DOCUMENTS

| DE | 17 96 325 A | 2/1964 |
| DE | 22 33 677 A | 7/1972 |
| EP | 0 557 673 A1 | 2/1992 |
| GB | 1 109 890 A | 12/1965 |

OTHER PUBLICATIONS

Database WPI, Section Ch, Week 197807, Derwent Publications Ltd., London, GB; AN 1978-13514A; XP-002223119—and SU 506 266 A (As SUSR Electrochem), May 30, 1977 Zusammenfassung.

Database WPI, Section Ch, Week 200173, Derwent Publications Ltd., London, GB; AN 2001-629482 XP002223120 and JP 2001 205086A (Ishifuku Kinzoku Kogyo KK), Jul. 31, 2001 Zusammenfassung.

Database WPI, Section Ch, Week 198607, Derwent Publications Ltd., London, GV; AN 1986-044483, XP002223121 and JP 60 210514 A (Elec Power Res Inst), Oct. 23, 1985 Zusammenfassung.

Database Compendix Online!; Engineering Information, Inc., New York, NY, US; Journal of Power Sources, 1999, Lasch K. et al.: "Effects of metal oxides as co–catalysts for the electro–oxidation of methanol on platinum–ruthenium" Database accession No. E2000104980171 XP002223118, Zusammenfassung.

European Search Report, OMG AG & Co. KG., dated Jan. 15, 2003.

Lasch, K et al. The Effect of Metal Oxides As Co–Catalysts for the Electro–Oxidation of Methanol on Platinum–Ruthenium, Journal of Power Sources, vol. 84, 1999, 225–230.

* cited by examiner

Primary Examiner—Ngoclan T. Mai
(74) Attorney, Agent, or Firm—Kalow & Springut LLP

(57) ABSTRACT

The invention provides platinum or platinum alloy powders for use in fuel cells and for chemical reactions. The powders are characterized by a high surface area and, at the same time, low chlorine contents. The powders are prepared by forming a melt which contains, as starting substances, a low melting mixture of alkali metal nitrates, a chlorine-free platinum compound and optionally chlorine-free compounds of alloying elements, the melt is then heated to a reaction temperature at which the platinum compound and the compounds of alloying elements thermally decompose to give oxides, the melt is then cooled and dissolved in water and the oxides or mixed oxides formed are converted into platinum or platinum alloy powders by subsequent reduction. Binary or ternary eutectic mixtures from the $LiNO_3$—$KNO_3$—$NaNO_3$ system are suitable as a low melting mixture of nitrates of the alkali metals. Hexahydroxoplatinic-(IV)-acid is preferably used as a chlorine-free platinum compound.

17 Claims, No Drawings

PLATINUM AND PLATINUM ALLOY POWDERS WITH HIGH SURFACE AREAS AND LOW CHLORINE CONTENT AND PROCESSES FOR PREPARING THESE POWDERS

FIELD OF THE INVENTION

The invention provides platinum or platinum alloy powders, preferably platinum/ruthenium alloy powders and a process for preparing these. The metal powders contain very little chlorine, have a high surface area and are preferably used as catalysts in chemical reactions (such as for example hydrogenation) and in fuel cells.

BACKGROUND OF THE INVENTION

It is known in the art that platinum/ruthenium catalysts are useful as anode catalysts for sulfuric acid fuel cells. These catalysts have a low tendency to be poisoned by carbon monoxide. They have also proven useful for the oxidation of methanol and are thus suitable for direct methanol fuel cells (DMFC=Direct Methanol Fuel Cell). They are frequently prepared by the so-called Adams-Shriner process.

Adams and Shriner describe the preparation of platinum-(IV)-oxide, (J. Am. Chem. Soc. 45,2171 (1923)). The preparation and catalytic effect of binary oxides, for example Pt/Ru oxide, are described by P. N. Rylander et al. (Engelhard Industries, Tech.Bull 8, 93 (1967)). The oxides prepared by this process can be reduced to the corresponding noble metal blacks by reducing agents such as hydrogen, formaldehyde or hydrazine. A metal black is understood to be a finely divided metal powder with a high specific surface area.

According to the Adams-Shriner process, a salt mixture which consists of hexachloroplatinic-(IV)-acid and an excess of sodium nitrate is melted in a quartz crucible and heated to 500° C. The melt is maintained at this temperature for a defined time and then cooled down. The solidified melt is dissolved in water and a residue of platinum oxide remains. This is filtered off and washed. The residue is then suspended and reduced to platinum black by reduction with a suitable reducing agent, for example hydrazine.

By using different chlorides of the platinum group metals (PGM) such as, for example, hexachloroplatinic-(IV)-acid and ruthenium-(III)-chloride, a mixture of the PGM oxides can be prepared in the desired ratio and then reduced to the metals.

The Adams-Shriner method of preparation has a number of inherent processing disadvantages: The process is based on first reacting the chlorine-containing noble metal compounds with sodium nitrate to give the corresponding noble metal nitrates which are then decomposed at elevated temperature to give the noble metal oxides. Large amounts of nitrogen oxides are produced during the decomposition process. Thus, the process pollutes the environment and is hazardous to one's health. Due to the intense generation of gas during the melting process, the melt tends to foam and has to be kept under constant control. Hexachloroplatinic-(IV)-acid which has not yet reacted becomes entrained in the escaping gas. This requires the use of considerable safety precautions during the entire process due to the allergenic effect of hexachloroplatinic-(IV)-acid.

The batch size can be increased to only a limited extent with this method. Adams and Shriner describe trials with mixtures of 4.2 g of hexachloroplatinic-(IV)-acid and 40 g of sodium nitrate which can be heated to the desired final temperature of, for example, 500° C. within a few minutes. With larger batches, substantially more time is required in order to achieve a homogeneous melt. In this case, some regions of the salt mixture have already been at the set-point temperature for a long time while other regions have still not melted. Since both the temperature and the residence time at that temperature have an effect on the particle size and the surface area of the oxides formed, considerable growth in the oxide particles has sometimes already taken place. Therefore, after reduction of these oxides to the metals, inhomogeneous, coarse-grained powders with a wide distribution of particle sizes and correspondingly low surface areas are obtained.

After solidification of the melt, it has to be knocked or dissolved out of the crucible, which requires considerable effort.

Due to the use of chlorine-containing starting materials, the end product still has a considerable concentration of chlorine, which is undesirable for industrial applications, in particular as fuel cell catalysts. In this case, high chlorine contents lead to corrosion problems and shorten the working life of fuel cell systems.

Based on the forgoing, there is a need in the art for a process for preparing platinum or platinum alloy powders which produces metal powders with uniform, finely divided particle sizes, high surface areas and low chlorine contents, even with large batches. In addition, the process is intended to be more environmentally friendly by reducing nitric oxide emissions and to minimize the risk of triggering allergies with regard to chlorine-containing platinum compounds. There is also a need in the art for platinum or platinum alloy powders with low chlorine content prepared by this process.

SUMMARY OF THE INVENTION

The present invention provides a platinum or platinum alloy powders and a process for preparing these. Accordingly, the present invention provides a platinum or platinum alloy powder for use as a catalyst in fuel cells or in chemical reactions, comprising a powder that has a BET specific surface area greater than 40 $m^2/g$ and has a chlorine content of less than 100 ppm.

For a better understanding of the present invention together with other and further advantages and embodiments, reference is made to the following description taken in conjunction with the examples, the scope of which is set forth in the appended claims.

DETAILED DESCRIPTION OF THE INVENTION

The invention will now be described in connection with preferred embodiments. These embodiments are presented to aid in an understanding of the present invention and are not intended to, and should not be construed to, limit the invention in any way. All alternatives, modifications and equivalents which may become obvious to those of ordinary skill on reading the disclosure are included within the spirit and scope of the invention.

This disclosure is not a primer on process for preparing platinum or platinum alloy powders, basic concepts known to those skilled in the art have not been set forth in detail.

The process according to the invention is achieved by forming a melt which contains, as starting substances, a low melting mixture of alkali metal nitrates, a chlorine-free platinum compound and optionally chlorine-free compounds of alloying elements, then heating the metal to a reaction temperature at which the platinum compounds and compounds of the alloying elements decompose thermally to give the oxides, then cooling the melt and dissolving in water and converting the oxides or mixed oxides formed into platinum or platinum alloy powders by subsequent reduction.

"Chlorine-free compounds" or "low chlorine content compounds" within the scope of the present inventions means compounds which are virtually chlorine-free or contain only trace amounts of chlorine, that is concentrations of chlorine of less than approximately 500 ppm.

The process according to the present invention differs substantially from the known Adams-Shriner process. While during the Adams-Shriner process, the chlorine-containing noble metal compounds are first converted into their nitrates by reaction with sodium nitrate, the low melting mixture of alkali metal nitrates according to the present invention is used only as a reaction medium and remains substantially unaltered. The chlorine-free compounds of platinum and the compounds of the alloying elements are thermally decomposed as a result of the increase in temperature in the melt. The melt stabilizes the oxide particles being formed and prevents their agglomeration into larger particles with low surface areas. In contrast, direct thermal decomposition of the platinum compound and compounds of the alloying elements does not lead to success. Coarsely divided oxide powders are formed which do not have sufficiently large surface areas. Typically, products with BET surface areas of up to only 40 $m^2/g$ can be obtained using the conventional Adams-Shriner process.

Apart from the absence of chlorine in the powders, an essential feature of the present invention, however, is the fact that finely divided platinum and platinum alloy powders with very high surface areas (BET values typically in the range 40 to 100 $m^2/g$) can be prepared therewith. These products are characterized by very high activity and performance when used as catalysts for chemical reactions or in fuel cells.

Binary or ternary mixtures of lithium nitrate, potassium nitrate and sodium nitrate are used as low melting mixtures of alkali nitrates. Binary and ternary eutectic mixtures in the $LiNO_3$—$KNO_3$—$NaNO_3$ system which have a particularly low melting point are preferably used. Whereas sodium nitrate melts only above 306° C. the melting point of a eutectic mixture of lithium nitrate and potassium nitrate is 132° C. The ternary system of lithium nitrate, potassium nitrate and sodium nitrate has a melting point of 120° C.

According to the invention, chlorine-free platinum compounds and chlorine deficient compounds of the alloying elements are used in the present process, wherein the alloying elements are preferably members of the platinum group metals ruthenium, rhodium, palladium, osmium and iridium. However, base metals such as, for example, vanadium, tungsten, molybdenum or others may also be used.

Nitrates of the noble metals may also be used in the process according to the invention. In this case, however, it has to be taken into consideration that nitrogen oxides are released during the thermal decomposition of these compounds which leads to foaming of the melt as described above and which have to be rendered harmless in a waste gas purification unit. Nevertheless, the use of nitrates does provide considerable advantages in the process according to the invention as compared with the Adams-Shriner process, because the substance mixture of noble metal compounds and alkali metal nitrates is very rapidly heated through uniformly due to the low melting point of the mixture. This fact was recognized by the inventors as an essential prerequisite for the preparation of noble metal powders with a uniform particle size distribution and high specific surface area. The allergenic potential of the process is also minimized by avoiding the use of hexachloroplatinic acid.

Preferably, however, chlorine-free and nitrate-free noble metal compounds are used. It is then possible to operate the process without any nitric oxide emissions at all because the alkali metal nitrates used are not subject to thermal decomposition at the temperatures of at most 600° C. used in the process.

The chlorine contents of the starting compounds and the end products are detected by the Wickboldt disintegration process and then determined in aqueous solution by ion chromatography (IC). The total chlorine content of the compound is determined in this way, this consisting of the sum of the free and bonded chlorine. The total chlorine content of suitable starting compounds should be less than 500 ppm.

The total chlorine content of the end products (platinum and platinum alloy blacks) is typically less than 100 ppm, preferably less than 50 ppm. Higher chlorine contents can lead to corrosion phenomena and a decrease in the operating lifetime of fuel cells.

Hexahydroxoplatinic-(IV)-acid is preferably used as a chlorine-free and nitrate-free platinum compound. Thermal decomposition of hexahydroxoplatinic-(IV)-acid in the salt melt leads to platinum oxide with a very high surface area which, after reduction, produces a platinum black with a correspondingly high surface area. If suitable compounds of alloying elements are added, mixed oxides and, after subsequent reduction of these oxides, also platinum alloy powders with high surface areas (BET surface areas in the range 40 to 100 $m^2/g$) can be prepared. Ruthenium-(IV)-oxide hydrate is preferably used as a chlorine-free ruthenium compound to produce a platinum/ruthenium black.

The process according to the invention offers two process variants for preparing the melts. According to the first variant, the starting substances, that is alkali metal nitrates, platinum compound and optionally compounds of alloying elements, are blended together and homogenized and then heated together until they melt. However it is more advantageous if only the mixture of alkali metal nitrates is first heated to above its melting point and then the chlorine-free platinum compound and optionally chlorine-free compounds of the alloying elements are introduced into the melt. This has the advantage that the entire melt has already assumed a uniform temperature when adding the noble metal compounds so that particle sizes which differ greatly from each other cannot be produced as a result of being subjected to the high temperature for different lengths of time. However, even the first process variant provides substantially better results than the Adams-Shriner process because the eutectic mixture of alkali metal nitrates melts at only 132° C. so that rapid temperature equilibration takes place in the homogenized mixture of starting materials at the relatively low temperatures involved.

If the second process variant is used, it is recommended that the platinum compound and optionally the compounds of alloying elements be added only at a temperature which is 20 to 40° C. above the melting point of the melt, that is at a temperature between 150 and 170° C.

The noble metal compounds mentioned are decomposed to give the corresponding oxides at a reaction temperature between 400 and 600° C. After the introduction of these compounds to the melt, this is therefore heated to a temperature within the range mentioned and then held at this temperature until decomposition is complete. Decomposition is normally complete after a period of about 10 minutes to 2 hours, depending on the temperature chosen.

The melt is then allowed to cool down. In contrast to the Adams-Shriner process, however, it is not necessary to wait for complete solidification of the melt. Rather, water can safely be added to the still liquid melt in the temperature range between 200 and 150° C., without this leading to the production of substantial amounts of steam because an endothermic process is involved. During the addition of water, the melt is continuously converted into an aqueous solution of alkali metal nitrates in which the finely divided oxides are suspended and can be separated therefrom by filtration. Time consuming dissolution of the solidified melt from the crucible, as in the Adams-Shriner process, is not required.

In principle, the solution of alkali metal nitrates can be concentrated and used again after filtering off the oxide particles.

The filter cake is suspended in water, preferably with the addition of caustic soda solution, and then reduced extensively to metallic platinum or platinum alloy powder by adding a reducing agent. Suitable reducing agents are hydrazine, formaldehyde or sodium borohydride, which are added to the suspension as aqueous solutions. The noble metal powders are separated from the suspension by filtration and then dried, preferably under vacuum at elevated temperatures of up to 100° C., and finally screened.

When preparing oxides by the process according to the invention, no, or only a very small, temperature effect on their specific surface areas is detected. Therefore changing the scale of preparation is easy. By adding water in amounts of a few percent, for example 1 to 5 wt. %, the melting point of the eutectic mixtures can be lowered to temperatures below 100° C. Lowering the melting point is possible in both process variants. This enables the use of compounds which cannot be prepared in the solid form, or only with great difficulty. Thus, for example, ruthenium can be used in the form of an aqueous solution of trinitratonitrosyl-ruthenium-(II) with a ruthenium content of 15 wt. %. On heating the melt, the water is safely given off over a wide temperature range. Trinitratonitrosyl-ruthenium-(II) first dissolves in the melt and decomposes in the desired manner with the formation of the oxide during further heating.

Nitrogen oxides are again released, however, during the thermal decomposition of trinitratonitrosyl-ruthenium-(II). Since, in this case, only one of the two alloying components is involved, the nitrogen oxide emissions are still much lower than in the Adams-Shriner process.

Having now generally described the invention, the same may be more readily understood through reference to the following examples, which are provided by way of illustration and are not intended to limit the present invention unless specified.

EXAMPLES

The invention is explained in more detail by the following examples.

The particle size of the powders is determined by X-ray diffraction from broadening of the diffraction maxima.

The specific surface area is determined by nitrogen adsorption using the Brunauer, Emmett and Teller (BET) method in accordance with DIN 66131.

Example 1

1 kg of a mixture of 65% potassium nitrate and 35% lithium nitrate are melted in a suitable crucible and heated to 150° C. 100 g of hexahydroxoplatinic-(IV)-acid are introduced into the melt and the temperature is increased to the reaction temperature of 450° C. After a period of 90 minutes at this temperature, the formation of platinum oxide is complete. The melt is then cooled, diluted with water at temperatures between 150 and 170° C. and then cooled further to room temperature. The solution is filtered and the residue is washed. The filter cake is suspended in 1500 ml of a 3% strength caustic soda solution and reduced with 800 ml of 6% strength hydrazine solution. Then the solid is filtered off, dried under vacuum at 65° C. and screened.

The platinum powder is used as a catalyst for the hydrogenation of cinnamic acid and demonstrates a very high hydrogenation activity.

| | |
|---|---|
| Particle size (XRD): | 4.2 nm |
| BET surface area: | 52 m$^2$/g (measured according to DIN 66131) |
| Total chlorine content: | <30 ppm |

Example 2

1 kg of a mixture of 65% potassium nitrate and 35% lithium nitrate are melted in a suitable crucible and heated to 150° C. 100 g of hexahydroxoplatinic-(IV)-acid are introduced into the melt and the temperature is increased to the reaction temperature of 500° C. After a period of 30 minutes at this temperature, the formation of platinum oxide is complete. The melt is then cooled, diluted with water at temperatures between 150 and 170° C. and then cooled further to room temperature. The solution is filtered and the residue is washed. The filter cake is suspended in 1500 ml of a 3% strength caustic soda solution and reduced with 800 ml of 6% strength hydrazine solution. Then the solid is filtered off, dried under vacuum at 65° C. and screened.

| | |
|---|---|
| Particle size (XRD): | 4.4 nm |
| BET surface area: | 47 m$^2$/g |
| Total chlorine content: | <30 ppm |

The platinum powder is used as a catalyst (for the anode and the cathode) in a PEM fuel cell operated with hydrogen/air and produces very good performance values which are stable over the long-term. h1 addition, the material also exhibits very good performance values when used as the cathode catalyst in a DMFC fuel cell.

These two examples show that the particle size is affected to only a small extent by the reaction temperature for decomposition of the noble metal compounds.

Example 3

1 kg of a mixture of 65% potassium nitrate and 35% lithium nitrate are melted in a suitable crucible and heated to 150° C. 51.5 g of hexahydroxoplatinic-(IV)-acid and 28.5 g of ruthenium-(IV)-oxide hydrate are introduced into the melt and the temperature is increased to 500° C. After a period of 30 minutes at this temperature the melt is cooled, diluted with water at temperatures between 150 and 170° C. and then cooled further to room temperature. The solution is filtered and the residue is washed. The filter cake is suspended in 1500 ml of a 3% strength caustic soda solution and reduced with 800 ml of 6% strength hydrazine solution. Then the solid is filtered off, dried under vacuum at 65° C. and screened.

The material is used as the anode catalyst for a direct methanol fuel cell (DMFC) and exhibits very good performance values when operated with methanol/air. Due to the low chlorine content, the DMFC exhibits high long-term stability.

| | |
|---|---|
| Pt/Ru ratio: | 50:50 (atom. %) |
| Particle size (XRD): | 5.2 nm |
| BET surface area: | 84 m²/g |
| Total chlorine content: | <40 ppm |

Comparison Example 1 (CE 1)

1.2 kg of sodium nitrate are homogeneously blended with 80 g of hexachloroplatinic-(IV)-acid (40 wt. % Pt) and 43 g of ruthenium-(lll)-chloride (39 wt. % Ru), placed in a suitable crucible and melted. The temperature is slowly increased to 500° C. After a period of 30 minutes at this temperature, the melt is cooled to room temperature. The solidified melt is dissolved out of the crucible with demineralized water, the solution is filtered and the residue is washed. The filter cake is suspended in 1500 ml of a 3% strength caustic soda solution and reduced with 800 ml of a 6% strength hydrazine solution. Then the solid is filtered off, dried under vacuum at 65° C. and screened.

| | |
|---|---|
| Pt/Ru ratio: | 50:50 (atom. %) |
| Particle size (XRD): | 5.2 nm |
| BET surface area: | 37 m²/g |
| Total chlorine content: | 836 ppm |

Example 4

50 ml of water are added to 1 kg of a mixture of 65% potassium nitrate and 35 % lithium nitrate and the mixture heated to 120° C. 51.5 g of hexahydroxoplatinic-(IV)-acid and 114 g of an aqueous solution of trinitratonitrosyl ruthenium-(II) with a ruthenium content of 15% are introduced and the temperature is increased to 500° C. After a period of 30 minutes at this temperature the melt is cooled, diluted with water at temperatures between 150 and 170° C. and then cooled further to room temperature. The solution is filtered and the residue is washed. The filter cake is suspended in 1500 ml of a 3% strength caustic soda solution and reduced with 800 ml of 6% strength hydrazine solution. Then the solid is filtered off, dried under vacuum at 65° C. and screened. The material is used as the anode catalyst in a DMFC fuel cell and there exhibits good, long term stability.

| | |
|---|---|
| Pt/Ru ratio: | 50:50 (atom. %) |
| Particle size (XRD): | 4.6 nm |
| BET surface area: | 87 m²/g |
| Total chlorine content: | <40 ppm |

While the invention has been described in connection with specific embodiments thereof, it will be understood that it is capable of further modifications and this application in intended to cover any variation, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed is:

1. A platinum or platinum alloy powder for use as a catalyst in fuel cells or in chemical reactions, comprising a powder that has a BET specific surface area greater than 40 m²/g and has a chlorine content of less than 100 ppm.

2. A platinum alloy powder according to claim 1, wherein the platinum alloy powder contains noble metals from the platinum group and/or base metals as alloying elements.

3. A process for preparing platinum or platinum alloy powders, comprising forming a melt which contains, as starting substances, a low melting mixture of alkali metal nitrates, a chlorine-free platinum compound and chlorine-free compounds of alloying elements; heating the melt to a reaction temperature at which the platinum compound and the compounds of the alloying elements thermally decompose to give oxides; cooling the melt; dissolving the melt in water, wherein the oxides or mixed oxides formed are converted into platinum or platinum alloy powders by subsequent reduction, and wherein said platinum or platinum alloy powders have a BET specific surface area greater than 40 m²/g and a chlorine content of less than 100 ppm.

4. A process according to claim 3, wherein the low melting mixture comprises a binary or ternary eutectic mixtures from the $LiNO_3$—$KNO^3$—$NaNO^3$ system.

5. A process according to claim 4, wherein a hexahydroxoplatinic-(IV)-acid is used as a chlorine-free platinum compound in order to form a platinum powder.

6. A process according to claim 4, wherein a hexahydroxoplatinic-(IV)-acid is used as a chlorine-free platinum compound and ruthenium-(IV)-oxide hydrate is used as a ruthenium compound in order to form a platinum/ruthenium alloy powder.

7. A process according to claim 4, wherein a hexahydroxoplatinic-(IV)-acid is used as a chlorine-free platinum compound and trinitratonitrosyl-ruthenium-(II) is used as a ruthenium compound in order to form a platinum/ruthenium alloy powder.

8. A process according to claim 3, wherein the melt is formed by heating a homogenized mixture of all the starting substances to above its melting point.

9. A process according to claim 8, wherein 1 to 5 wt. % of water is added to the homogenized mixture of starting substances before the melting process.

10. A process according to claim 3, wherein the melt is formed by first heating only the mixture of alkali metal nitrates to above its melting point and then introducing the chlorine-free platinum compound and the chlorine-free compounds of alloying elements into the melt.

11. A process according to claim 10, wherein the platinum compound and optionally the compounds of alloying elements are added to the melt at a temperature between 150 and 170° C.

12. A process according to claim 11, wherein the reaction temperature is set at a value between 400 and 600° C. and the melt is held at this temperature for a period of 10 minutes to 2 hours.

13. A process according to claim 12, wherein the water to dissolve the melt is added to the melt in the temperature interval between 200 and 150° C. as it is cooling.

14. A process according to claim 10, wherein 1 to 5 wt. % of water is added to the mixture of alkali metal nitrates before the melting process.

15. A membrane electrode unit for a fuel cell containing platinum or platinum alloy powder according to claim 1 as an anode and/or cathode catalyst.

16. A catalyst for fuel cells comprising the powder of claim 1.

17. A catalyst for chemical reactions comprising the powder of claim 1.

* * * * *